(12) United States Patent
Lacroix (10) Patent No.: US 9,941,711 B2
(45) Date of Patent: Apr. 10, 2018

(54) METHOD FOR MANAGING THE LEVEL OF CHARGE OF AT LEAST TWO BATTERIES, CORRESPONDING DEVICE AND COMPUTER PROGRAM

(75) Inventor: Pierre Lacroix, Montauban (FR)

(73) Assignee: INGENICO GROUP, Paris (FR)

( * ) Notice: Subject to any disclaimer, the term of this patent is extended or adjusted under 35 U.S.C. 154(b) by 1343 days.

(21) Appl. No.: 13/992,365

(22) PCT Filed: Dec. 7, 2011

(86) PCT No.: PCT/EP2011/072004
§ 371 (c)(1),
(2), (4) Date: Aug. 19, 2013

(87) PCT Pub. No.: WO2012/076570
PCT Pub. Date: Jun. 14, 2012

(65) Prior Publication Data
US 2013/0320761 A1    Dec. 5, 2013

(30) Foreign Application Priority Data

Dec. 7, 2010  (FR) ..................... 10 60204
Dec. 7, 2010  (FR) ..................... 10 60207

(51) Int. Cl.
*H02J 7/00*   (2006.01)
*H02J 7/04*   (2006.01)
*H04M 1/73*   (2006.01)

(52) U.S. Cl.
CPC .......... *H02J 7/0014* (2013.01); *H02J 7/0054* (2013.01); *H02J 7/044* (2013.01); *H04M 1/73* (2013.01); *Y10T 307/313* (2015.04)

(58) Field of Classification Search
CPC ........ H02J 7/0054; H02J 7/044; H02J 7/0014; H04M 1/73
(Continued)

(56) References Cited

U.S. PATENT DOCUMENTS

| 2003/0025476 A1* | 2/2003 | Trela ..................... H02J 7/0003 320/107 |
| 2003/0050102 A1 | 3/2003 | Roh |

(Continued)

FOREIGN PATENT DOCUMENTS

| EP | 0599244 A2 | 6/1994 |
| KR | 100837637 B1 | 6/2008 |

(Continued)

OTHER PUBLICATIONS

French Search Report dated Apr. 28, 2011 for corresponding French Application No. FR 1060207, filed Dec. 7, 2010.

(Continued)

*Primary Examiner* — Daniel Kessie
(74) *Attorney, Agent, or Firm* — David D. Brush; Westman, Champlin & Koehler, P.A.

(57) ABSTRACT

A method is provided for managing the level of charge of at least two batteries respectively powering a first and a second device. The devices are able to cooperate physically with one another via a modular interface, and the method includes a step of transferring energy from one of the batteries to the other of the batteries, the transferring step being implemented as a function of a level of charge of at least one of the batteries.

8 Claims, 5 Drawing Sheets

(58) Field of Classification Search
USPC .......................................................... 307/19
See application file for complete search history.

(56) References Cited

U.S. PATENT DOCUMENTS

| | | |
|---|---|---|
| 2003/0178967 A1 | 9/2003 | Khatri |
| 2004/0104268 A1 | 6/2004 | Bailey |
| 2005/0236480 A1* | 10/2005 | Vrotsos ................ G06Q 20/341 |
| | | 235/439 |
| 2006/0049255 A1 | 3/2006 | von Mueller et al. |
| 2007/0236975 A1* | 10/2007 | Lippojoki ............. H02J 7/0054 |
| | | 363/66 |
| 2009/0023480 A1 | 1/2009 | Nandi et al. |
| 2011/0016333 A1 | 1/2011 | Scott et al. |

FOREIGN PATENT DOCUMENTS

| | | |
|---|---|---|
| WO | 2006018229 A1 | 2/2006 |
| WO | WO 2010/033076 * | 3/2010 |

OTHER PUBLICATIONS

French Search Report dated Jun. 22, 2011 for corresponding French Application FR 1060204, filed Dec. 7, 2010.
International Search Report dated Feb. 22, 2012 for corresponding International Application. No. PCT/EP2011/072004, filed Dec. 7, 2011.
Written Opinion of the International Searching Authority for PCT/EP2011/072004, filed Dec. 7, 2011. 9 pgs.

* cited by examiner

METHOD FOR MANAGING THE LEVEL OF CHARGE OF AT LEAST TWO BATTERIES, CORRESPONDING DEVICE AND COMPUTER PROGRAM

CROSS-REFERENCE TO RELATED APPLICATIONS

This Application is a Section 371 National Stage Application of International Application No. PCT/EP2011/072004, filed Dec. 7, 2011, which is incorporated by reference in its entirety and published as WO 2012/076570 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The present invention pertains to the field of electronic payment terminals. More particularly, the present invention pertains to a novel type of electronic payment terminal that can be formed by two paired devices, and especially to the management of the powering of such a terminal.

PRIOR ART

At present, payment terminals are used mostly to enable payment for purchases of goods and services at sales points. These terminals generally include a smartcard reader and a magnetic card reader. They also have a screen used in particular to view the amounts involved in the transactions and a keypad for entering these amounts as well as confidential codes, entered by the customers, or else they have a touch-sensitive screen.

The most recent terminals are connected to cash registers and/or to computers by means of communications networks. Such connections can be cable connections, for example of the Ethernet type, or wireless connections. These connections are used for example to link up to an authentication server or to a bank server in order to obtain an authorization of debit.

In order to be able to communicate with the exterior and especially with bank servers, the terminal payments therefore use connection means. One of these means consists of the use of a wireless communications network, for example GPRS (General Packet Radio Service) network. The payment terminal is then provided with a SIM (Subscriber Identity Module) card. This is a chip containing a microcontroller and memory. This SIM card is associated with a telephone subscription (of the data transmission type) which must be paid for by the merchant. Apart from the fact that this type of subscription is relatively costly, the performance of communications functions is assigned to the payment terminal. Thus, in addition to the payment functions, the terminal must manage communications functions which are not naturally the functions expected of a payment terminal.

To mitigate the problem of subscription costs associated with the GPRS communication in particular, novel types of payments terminals communicate by means of a WiFi (Wireless Fidelity) type of network for example. The merchant then is no longer obliged to take out a particular subscription. The payment terminal can link up to the merchant's WiFi network and access the bank servers in the same way as in the wire connection. However, the use of the payment terminal is then limited to the coverage zone of the WiFi network, which is not suited to nomadic use (for example for a doctor visiting his patients).

There is therefore a need to propose a payment terminal that can be used by nomadic merchants, hence through the use of a GPRS/UMTS type wireless communications network and, at the same time, to reduce the costs of using such a payment terminal to the minimum.

Besides, a payment terminal of this kind can also be able to benefit from an autonomy adapted to its use by a nomadic tradesman.

SUMMARY OF THE INVENTION

The invention does not have these prior-art drawbacks. The invention pertains more particularly to a payment terminal that takes the form of a device called a "payment device" that is physically paired with a communications terminal.

More particularly, the communications terminal with which the payment device is paired is a mobile telephone commonly called a "smartphone", i.e. a mobile phone also having the functions of a personal digital assistant (PDA).

Thus, the invention makes it possible to overcome the drawbacks of the prior art and especially makes it possible to avoid having recourse to a dedicated telephone line in order to set up a connection with the communications network and with servers such as authorization servers or bank servers.

Besides, because of the pairing of two devices, the invention has a notable particular feature in terms of management of the charge of each of the two devices (the payment device and the communications terminal) forming the payment terminal.

Indeed, each of these devices has its own battery, the charge of which changes as a function of the use of the device. Now, the progress of the charge of the battery of the payment device is different from that of the charge of the communications terminal because of the specific functions of each device.

Thus, when one of the two devices is discharged, it is necessary to interrupt its use in order to recharge it and therefore to interrupt the use of the payment terminal whatever the level of charge of the battery of the other device.

In particular, when the communications device is discharged, it must be removed from the payment terminal to be recharged in a classic way, thus preventing the operation of the payment terminal which no longer possesses its communication functions.

We shall strive more particularly here below in the document to describe the problems existing in the field of electronic payment terminals with which the inventors of the present patent application have been faced. The invention of course is not limited to this particular field of application but is of interest for all techniques relating to terminals formed by two paired devices having to cope with proximate or similar issues and problems.

The invention proposes a novel solution which does not have all these drawbacks of the prior art, in the form of a method for managing the level of charge of at least two batteries respectively powering a first device and a second device.

According to the invention, the devices are capable of physically cooperating with each other through a modular interface and such a method comprises a step for transferring energy from one of the batteries to the other battery, the step for transferring being carried out according to a level of charge of at least one of the batteries.

Thus, the method according to this embodiment of the invention ensures that neither of the batteries of the two paired devices reaches a critical charge level that requires immediate recharging.

Indeed, the method according to this embodiment of the invention makes it possible to maintain a homogenous level of charge for each of the batteries of the paired devices without interrupting the normal use of the device formed by the first and second devices, for example a payment terminal, in monitoring the level of charge of the batteries and in transferring the energy of one battery to the other if necessary.

According to one particular characteristic of the invention, the method comprises the following steps:
  obtaining at least one piece of information on level of charge for each of the batteries, delivering a first piece of information on level of charge for the first device and a second piece of information on level of charge for the second device;
  comparing the first and second pieces of information on level of charge with, respectively, a first predetermined threshold and a second predetermined threshold, respectively delivering a first comparison result and a second comparison result, a comparison result being said to be positive when the level of charge is above the threshold and a comparison result being said to be negative when the level of charge is below the threshold.

Thus, to optimally manage the levels of charge of the batteries of the paired devices, the method uses information on level of charge for one and/or the other battery so as to compare each of them with a predetermined threshold that is identical or distinct. Thus, for one and/or the other battery, it obtains a result of comparison corresponding to the status of the level of charge of the battery, for example "correct level of charge" when the level is above the predetermined threshold or "low level of charge" when the level is below the predetermined threshold.

According to one characteristic of the invention, the method also comprises a step for receiving at least one request for transfer of energy from one of the batteries to the other battery, coming from one of the devices which has a level of charge of its battery that is below a predetermined threshold.

Thus, this embodiment of the invention provides that a device will send a request for transfer of energy when the level of charge of its battery is judged to be too low.

In particular, the step for transferring energy is carried out when either of the following conditions is verified:
  the first result of comparison is negative and the second result of comparison is positive;
  the second result of comparison is negative and the first result of comparison is positive.

Thus, the method according to this embodiment of the invention does not implement a transfer of energy from one battery to the other unless one of the two batteries requires it and unless the other battery has a sufficient level, relative to a predetermined threshold. This makes it possible not to transfer energy from a battery for which the level of charge is low.

According to another embodiment, the step for transferring energy is carried out when a request for transfer of energy has been received during the step for receiving and when either of the following conditions is verified:
  the first result of comparison is negative and the second result of comparison is positive;
  the second result of comparison is negative and the first result of comparison is positive.

In this case, the energy transfer is carried out only if a request has been sent by one of the devices. Thus, the decision to transfer is subject not only to conditions of level of charge relative to predetermined thresholds but also to an explicit request for transfer.

According to one particular characteristic, the step for transferring energy is implemented by the modular interface that provides the physical pairing of the two devices. Indeed, this interface enables the communication between the two devices and especially the transfer of energy from the battery of one of the devices to the battery of the other device.

In particular, the first device can be a payment device and the second device can be a communications device.

Another aspect of the invention pertains to a component for managing the level of charge of at least two batteries respectively powering a first device and a second device.

According to the invention, the devices are capable of physically cooperating with each other VIA a modular interface and such a device for managing the level of charge is capable of carrying out the steps of the method described here above and especially comprises means for transferring energy from one of the batteries to the other battery, the means for transferring energy being activated as a function of a level of charge of at least one of the batteries.

According to one particular embodiment, the component is implanted in a first device comprising payment means, including means for reading a smartcard and means for reading a magnetic card, and said second device is a telephone terminal, said first device comprising means to receive and communicate with said telephone terminal.

The invention also pertains to a computer program comprising instructions for implementing the method described here above when this program is executed by a processor.

LIST OF FIGURES

Other features and advantages of the invention shall appear more clearly from the following description of a particular embodiment given by way of a simple illustratory and non-exhaustive example and from the appended figures, of which.

DESCRIPTION OF ONE EMBODIMENT OF THE INVENTION

The general principle of the invention relies on the physical pairing of two devices, for example a payment terminal and a communications terminal, such as a telephone terminal, for example a smartphone, to form a payment terminal, and to the management of the charging of these two devices.

More particularly, in one embodiment of the invention, the payment device is physically paired with the communications terminal by means of a particular pairing structure, called a modular interface. When it is used, this modular interface is fixed to a rear face of the payment device. This structure can be dismantled according to one particular embodiment of the invention by applying a particular mode of kinematic functioning.

This modular interface according to the invention enables the insertion and retaining of the communications terminal in a housing planned for this purpose. Among the elements of this modular interface, according to the invention, it is possible to distinguish particularly an electronic connection card by which a physical connection can be set up between the payment device and the communications terminal.

This modular interface comprises other elements which, according to the invention, enable secure use of the payment terminal formed by the payment device and the communications terminal.

More particularly, the payment terminal that is an object of the invention is described with reference to FIGS. 1A to 1D.

The payment terminal (10) comprises two general components constituted by the payment device (20) and the communications terminal (30).

Figure 1A:
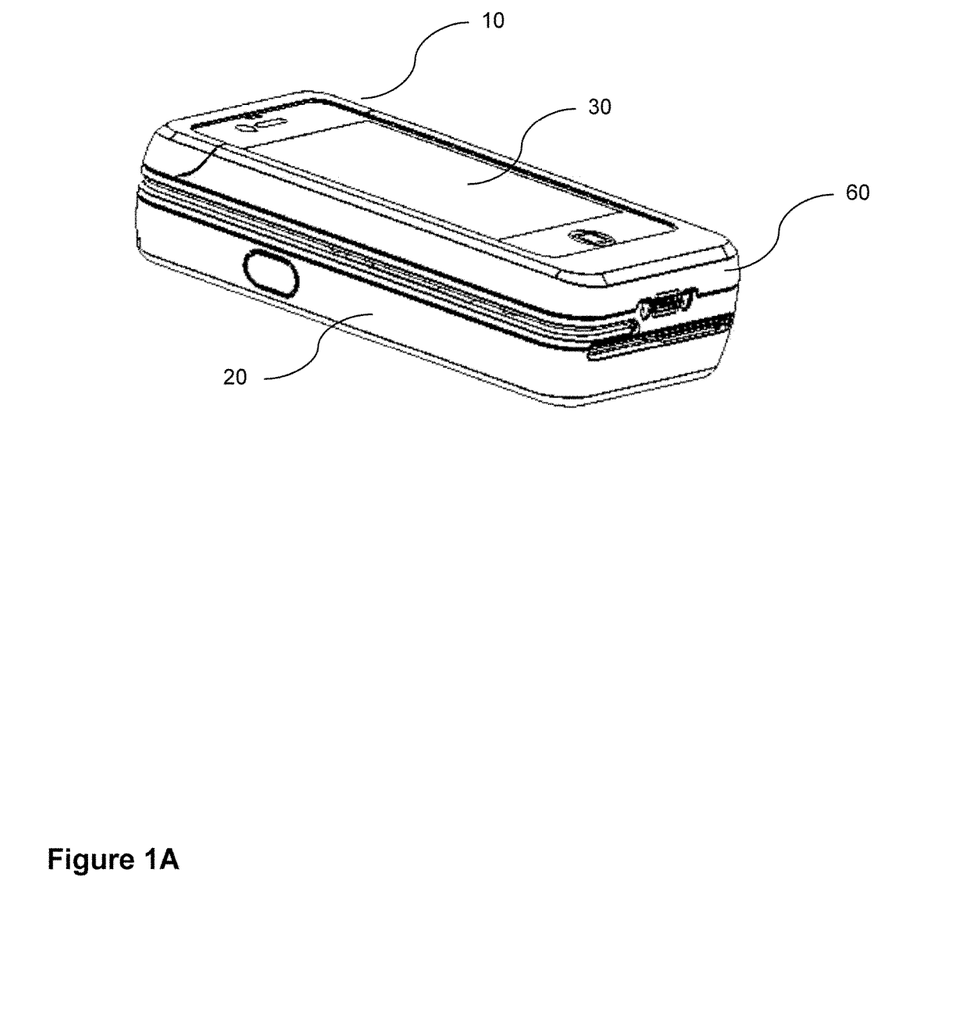
FIGS. 1A to 1D illustrate an example of a payment terminal according to one embodiment of the invention.
Figure 1B:
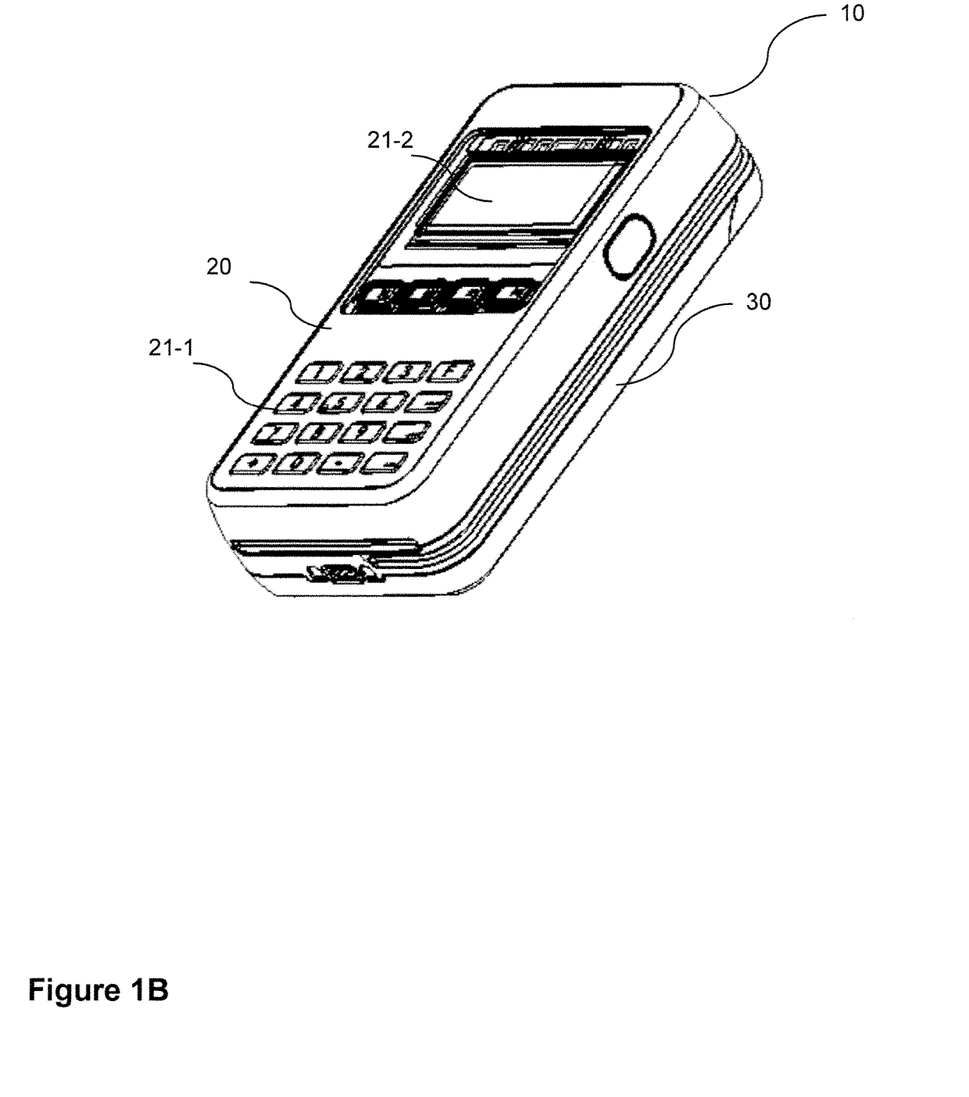
Figure 1C:
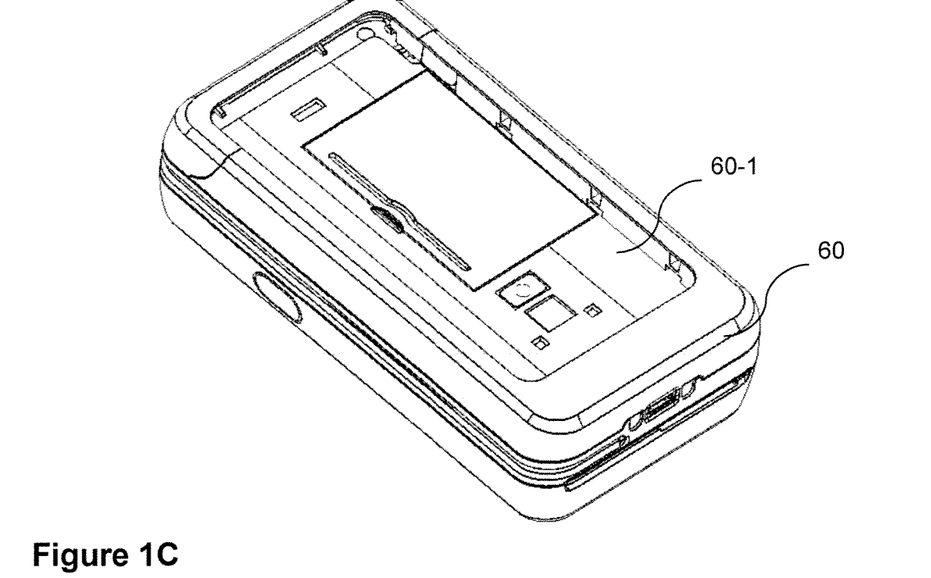

As illustrated in an illustrative and non-exhaustive embodiment of the invention, the payment device (20) comprises a front face, which can be seen in FIG. 1B, having a keypad for keying in information (21-1), a screen for viewing (21-2) the information keyed in. The payment device comprises, on the rear face which can be seen in FIG. 1D, a surface (22) enabling the attachment of a modular interface (60) for the pairing of the communications terminal (30).

Figure 1D:
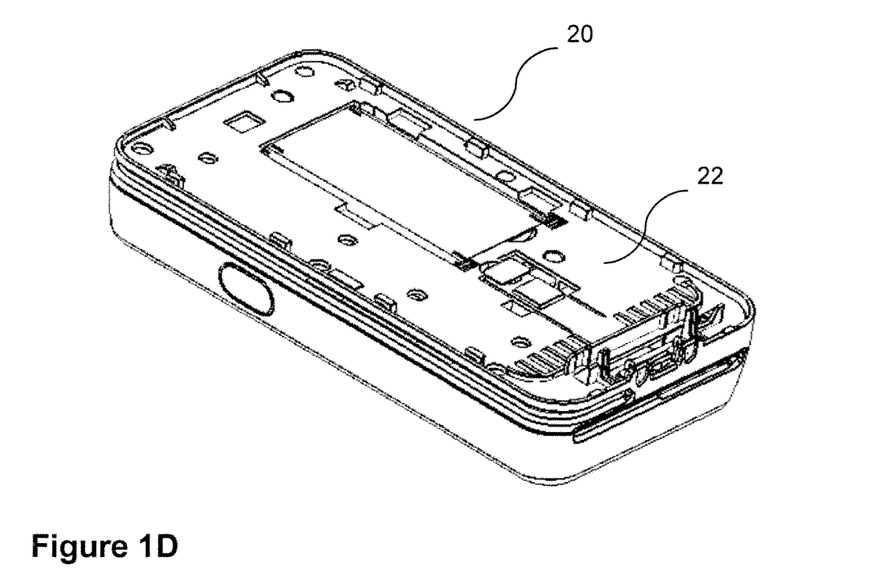

More particularly, this modular interface defines a housing (60-1) for inserting and pairing the communications terminal (30).

Figure 2A:
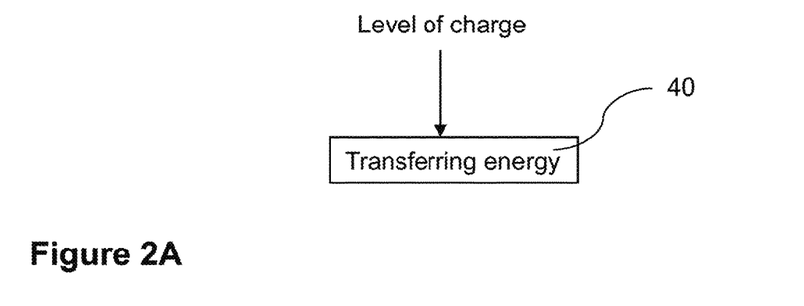
FIGS. 2A and 2B illustrate the main steps of the method for managing the level of charge of at least two batteries for a payment terminal as illustrated in FIGS. 1A to 1D according to one embodiment of the invention.
Figure 2B:
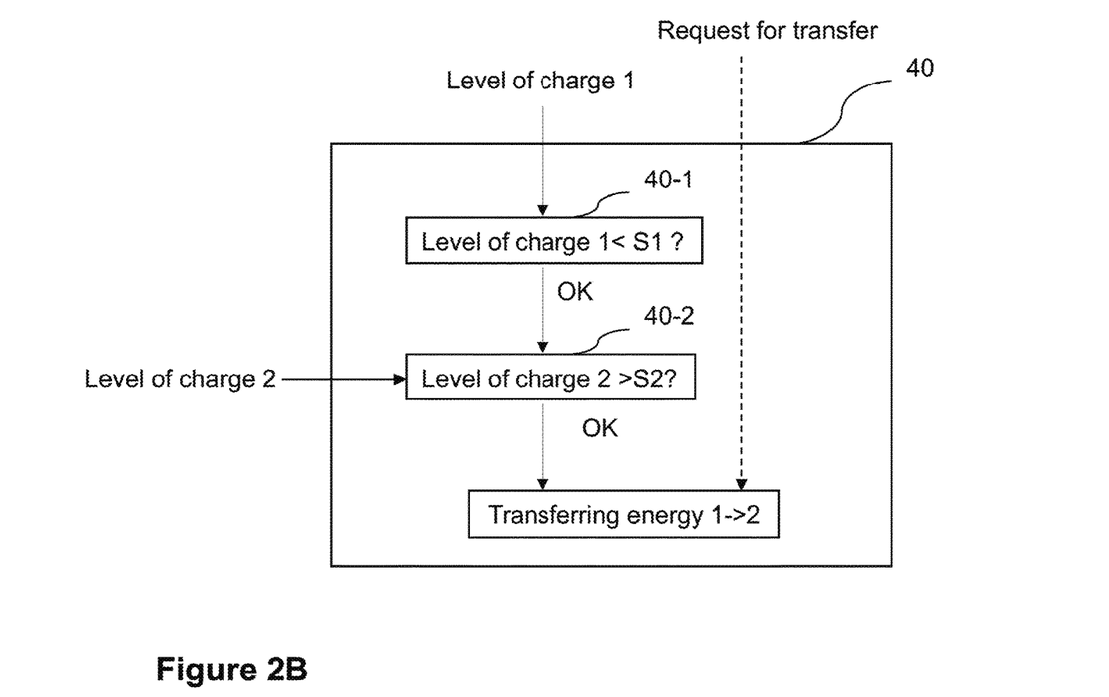

Referring now to FIGS. 2A and 2B, we present an example of a method for managing the charge of at least two batteries according to one embodiment of the invention.

On the basis of a piece of information on level of charge of a battery, the method carries out a step 40 for transferring energy from one battery to another.

More particularly, it is the first device, for example a payment device (20), that is deemed to be managing the charging of its own battery and that of the battery of the second device, for example a communications terminal (30).

Thus, when the payment terminal formed by a payment device and a communications device is used, the method for managing according to this embodiment makes it possible to maintain homogenous levels of charge for both batteries.

To this end, as illustrated in FIG. 2B, the method for managing obtains a piece of information on level of charge of the battery of the second device, for example a communications device, denoted as "level of charge 1".

This piece of information on level of charge is given by the second device, via the modular interface (60), continuously, periodically or only when the level of charge is situated below a predetermined threshold.

It must be noted that the level of charge of the battery of the second device is monitored and managed by the second communications device, classically.

Besides, the method for managing obtains a piece of information on level of charge of the battery of the first device, for example a payment device, denoted as "level of charge 2". This piece of information on level of charge 2 is provided by the first device which itself monitors the level of charge of its battery, and therefore has this piece of information at its disposal when it carries out the method for managing according to the invention.

From these two pieces of information on level of charge, the method according to the invention carries out, successively and in parallel, the steps (40-1) and (40-2) which consist in comparing each piece of information on level of charge with a predetermined threshold.

In a first stage, the level of charge of the battery of the second device is compared with a threshold S1 during the step (40-1), so as to determine if a transfer of energy is needed.

In a second stage, and as illustrated in FIG. 2B, when the result of the previous comparison is negative (i.e. when the level of charge 1 is below the threshold S1), the level of charge of the battery of the first device is compared with a threshold S2 at the step (40-2) so as to determine whether a transfer of energy can be envisaged.

Finally, if the result of the previous comparison is positive, a step for transferring energy from the battery of the first device to the battery of the second device is implemented.

More particularly, in this embodiment, means for managing the level of charge ascertain that there is enough energy available in either terminal to carry out a transaction up to the end. Thus, the invention makes sure that the bank transaction can be completed. This characteristic makes it possible to face the problems raised by the use of battery terminals, especially in a situation of mobility.

Thus, when the level of charge of the battery of the second device is insufficient and when a transaction has to take place, the means for managing the level of charge carry out the transfer of energy in order to provide sufficient energy to the second device. The reverse is also possible: when the level of charge of the battery of the first device is insufficient and when a transaction has to take place, the means for managing the level of charge carry out the transfer of energy in order to supply sufficient energy to the first device.

According to one variant of this embodiment, this step for transferring is carried out only if the request for transfer has been sent by the second device.

Figure 3:
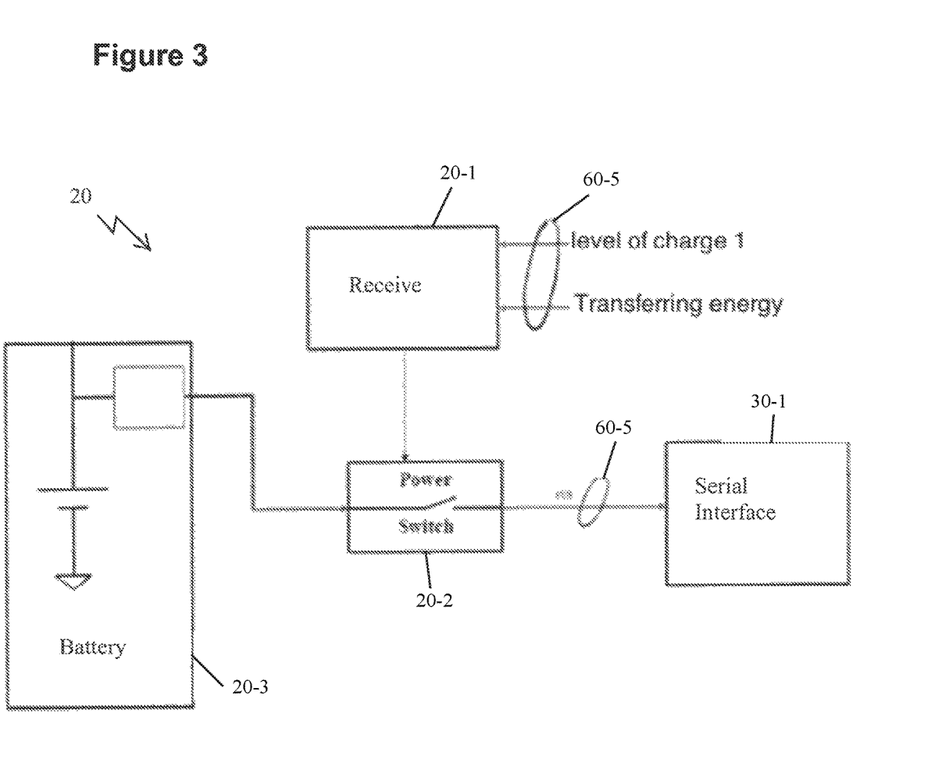
FIG. 3 describes an example of a structure of a device for managing the level of charge of at least two batteries for a payment terminal as illustrated in FIGS. 1A to 1D, according to one embodiment of the invention.

Referring to FIG. 3, a description is provided of an example of a structure of a device for managing the level of charge of at least two batteries for a payment terminal, according to one particular embodiment of the invention.

In this embodiment, it is a payment terminal (20) that is considered to be managing the charging of its own battery (20-3) and that of the battery of a communications device (30) via means (20-1, 20-2).

The means (20-1) receive, via a serial link of the communications card 60-5 of the modular interface 60, a piece of information on level of charge 1 and, as the case may be, a request for transfer of energy.

As indicated here above, this piece of information on level of charge 1 can be received continuously, periodically or only when the level of charge is below a threshold.

The means (20-1) also have a piece of information on level of charge 2 of the battery (20-3) of the payment device and carry out the comparisons of the levels of charge 1 and 2 respectively with thresholds S1 and S2.

Depending on the result of these comparisons, the means (20-2) are activated so as to enable a transfer of energy from the battery (20-3) to the communications device 30. More particularly, the transfer of energy is done towards a serial interface 30-1 of the communications device, via a serial link of the communications card 60-5 of the modular interface 60.

Another application of the invention consists in managing the level of charge of the batteries of each of the paired devices when the payment terminal is being charged, by means of its power supply base.

In this case, the power supply provided by the payment device (30) is also transmitted to the communications device (30) by means of the modular interface (60) enabling the pairing of the two devices. The communications device independently managing the level of charge of its own battery uses or does not use this source of energy to recharge its battery.

In this way, when the payment terminal (10) is being charged, the battery of each device (20, 30) forming the payment terminal can be recharged.

Although the present disclosure has been described with reference to one or more examples, workers skilled in the art will recognize that changes may be made in form and detail without departing from the scope of the disclosure and/or the appended claims.

The invention claimed is:

1. A method for managing the level of charge of at least two batteries respectively powering a payment device and a communication device, said devices being capable of physically cooperating with each other via a modular interface, said method comprising:
   connecting the payment device to the communications device through the modular interface;
   transferring energy from one of said batteries to the other of said batteries, wherein transferring is carried out according to a level of charge of at least one of said batteries;
   obtaining at least one piece of information on level of charge for each of said batteries, which provides a first piece of information on level of charge for said payment device and a second piece of information on level of charge for said communication device; and
   comparing the first and second pieces of information on level of charge with, respectively, a first predetermined threshold and a second predetermined threshold, respectively producing a first comparison result and a second comparison result, a comparison result being positive when the level of charge is above the threshold and a comparison result being negative when the level of charge is below the threshold,
   when either the first comparison result or the second comparison result is negative, performing the act of transferring so that both the payment device and the communications device have sufficient levels of charge at least to carry out a bank transaction up to an end of the bank transaction.

2. The method for managing the level of charge of at least two batteries according to claim 1, further comprising receiving at least one request for transfer of energy from one of said batteries to another of said batteries, coming from one of said devices for which the level of charge of its battery is below a predetermined threshold.

3. The method for managing the level of charge of at least two batteries according to claim 1, wherein transferring energy is carried out when either of the following conditions is verified:
   the first result of comparison is negative and the second result of comparison is positive;
   the second result of comparison is negative and the first result of comparison is positive.

4. The method for managing the level of charge of at least two batteries according to claim 2, wherein transferring energy is carried out when a request for transfer of energy has been received during said receiving and when either of the following conditions is verified:
   the first result of comparison is negative and the second result of comparison is positive;
   the second result of comparison is negative and the first result of comparison is positive.

5. The method for managing the level of charge of at least two batteries according to claim 1, wherein transferring energy is carried out by said modular interface.

6. A component for managing the level of charge of at least two batteries respectively powering a payment device and a communication device, said devices being capable of physically cooperating with one another via a modular interface, said component for managing comprising:
   a switch, which transfers energy from one of said batteries to the other of said batteries, said switch being activated according to a level of charge of at least one of said batteries;
   a processor programmed by instructions stored in a non-transitory computer-readable medium to:
   connect the payment device to the communications device through the modular interface;
   obtains at least one piece of information on level of charge for each of said batteries, which provides a first piece of information on level of charge for said payment device and a second piece of information on level of charge for said communication device; and
   compare said first and second pieces of information on level of charge with, respectively, a first predetermined threshold and a second predetermined threshold, respectively producing a first comparison result and a second comparison result, a comparison result being positive when the level of charge is above the threshold and a comparison result being negative when the level of charge is below the threshold,
   when either the first comparison result or the second comparison result is negative, activate the switch to transfer so that both the payment device and the communications device have sufficient levels of charge at least to carry out a bank transaction up to an end of the bank transaction.

7. The component according to claim 6, wherein the component is implanted in the payment device, which includes a smartcard reader and a magnetic card reader, and said communication device is a telephone terminal, said payment device comprising the modular interface to receive and communicate with said telephone terminal.

8. A non-transitory computer-readable medium comprising a computer program stored thereon and comprising instructions for implementing a method for managing the level of charge of at least two batteries, when this program is executed by a processor, the at least two batteries respectively powering a payment device and a communication device, said devices being capable of physically cooperating with each other via a modular interface, wherein the method comprises:
   connecting the payment device to the communications device through the modular interface;
   transferring energy from one of said batteries to the other of said batteries, wherein transferring is carried out according to a level of charge of at least one of said batteries;

obtaining at least one piece of information on level of charge for each of said batteries, which provides a first piece of information on level of charge for said payment device and a second piece of information on level of charge for said communication device; and comparing the first and second pieces of information on level of charge with, respectively, a first predetermined threshold and a second predetermined threshold, respectively producing a first comparison result and a second comparison result, a comparison result being positive when the level of charge is above the threshold and a comparison result being negative when the level of charge is below the threshold, when either the first comparison result or the second comparison result is negative, performing the act of transferring so that both the payment device and the communications device have sufficient levels of charge at least to carry out a bank transaction up to an end of the bank transaction.

* * * * *